United States Patent [19]

Rogers

[11] 4,094,423

[45] June 13, 1978

[54] TILTING ASSEMBLY FOR PICK-UP HEAD

[76] Inventor: James Rogers, P.O. Box 2011, Haines City, Fla. 33844

[21] Appl. No.: 764,430

[22] Filed: Jan. 31, 1977

[51] Int. Cl.[2] .............................................. B65G 67/46

[52] U.S. Cl. ................................ 214/147 G; 214/302; 214/315; 294/88

[58] Field of Search .................. 294/86 R, 86 LS, 88, 294/103 CG, 104; 214/147 R, 147 G, 302, 313, 652, 315

[56] References Cited

U.S. PATENT DOCUMENTS

| | | | |
|---|---|---|---|
| 2,683,546 | 7/1954 | Sherriff | 214/652 |
| 3,140,787 | 7/1964 | Clar | 214/302 |
| 3,447,705 | 6/1969 | Stone | 294/104 X |
| 3,618,800 | 11/1971 | Collins et al. | 294/86 R X |

*Primary Examiner*—Johnny D. Cherry

*Attorney, Agent, or Firm*—Duckworth, Hobby, Allen & Pettis

[57] ABSTRACT

An orienting device or more specifically a tilting mechanism designed to be used primarily with selectively maneuverable pick-up heads of the type used to handle large baskets in the loading and general harvesting of citrus products and the like. The orienting device comprises a frame having a fluid activated piston and cylinder assembly interconnected between the frame and a lever arm attached to the rotary shaft of the pick-up head whereupon activation of the piston and cylinder assembly, rotation of the lever arm and attached rotary shaft causes tilting or predetermined orientation of the pick-up head. The entire frame and the attached rotary shaft pivots about a pivot shaft serving also as the point of interconnection of the supporting boom, and located above and spaced from the rotary shaft of the pick-up head.

8 Claims, 4 Drawing Figures

TILTING ASSEMBLY FOR PICK-UP HEAD

BACKGROUND OF THE INVENTION

1. Field of the Invention

This invention is directed to an orienting assembly or tilting mechanism designed to be used primarily with a pick-up head designed for the loading and emptying of large bulk containers in which citrus and like fruit is loaded, and transported from the fields to trucks or the like for transporting to packing or processing facilities.

2. Description of the Prior Art

In the harvesting of fruit and particular citrus type products it is commonplace for the fruit to be transferred to large bulk containers disposed at various locations throughout the field of harvesting. These containers are, when filled, picked up by a boom type pick-up head and transported to an open-bodied truck or the like wherein the entire bulk container, through manipulation of the pick-up head, is tilted and the contents or citrus products therein are emptied into the open-bodied truck. In order to accomplish material handling of the containers, numerous devices have been developed which include the use of a boom structure attached to the truck or the like having a pick-up head movably attached to the end of the boom for engagement and grasping of the container as set forth above. Numerous and generally complicated and complex structures have been devised and are currently being utilized to accomplish this material handling.

Representative of the prior art of the structures described is the disclosure set forth in the U.S. Pat. No. 3,447,705 to Stone. Therein, a pick-up and dump mechanism is disclosed utilizing a fluid actuated pick-up head for grasping a container, raising the container to the open bed of the truck and tilting the container through manipulation of the pick-up head and therefore the attached container, such that the citrus contents pour out of the container when in its tilted position and into the open bed of the truck. The container is then replaced in its original position, and all of the handling of the container is done by the selective manipulation of the pick-up head disposed in supportive relation to the carrying boom or the like. As represented by Stone, various devices have been produced for the transferring of citrus and like fruits and generally handling such citrus products after picking. Such devices utilize both hand and power equipment but generally suffer from the requirement of utilizing substantial labor or workman time as well as being overly complex thereby adding to the maintenance. All these problems, of course, affect the cost of operation. While it is obvious that certain of the prior art devices which are now commercially available are certainly applicable to certain situations, it is frequently recognized that the equipment currently available is somewhat overly complex and in many instances unreliable.

It is, therefore, of course, highly desirable to provide a relatively simple, practical and efficient mechanism for selectively tilting or orienting a gripping head having a bulk container attached thereto wherein the orienting assembly to accomplish this positioning would be sufficiently structured to handle relatively heavy loads. Also, the structural design of such an assembly should be sufficient to maintain relatively low initial purchase costs as well as maintenance costs for the obvious reasons set forth above.

SUMMARY OF THE INVENTION

This invention relates to an orienting assembly or more specifically a tilting device designed to be used for the selective positioning in either an upright or tilting position of a pick-up head. The pick-up head referred to hereinafter is of the type generally associated with the grasping and handling of large bulk containers in which citrus and the like fruit products are placed for loading onto trucks or the like and transported to packing or processing facilities. It should be noted that while the orienting assembly of the present invention is specifically described for use with a supporting boom structure and the pick-up head itself, neither the structural features of the boom nor the pick-up head or its grasping arrangement are, per se, considered to be a part of the present invention. Rather, the subject invention is directed towards the mechanism for orienting the pick-up head relative to the supporting boom structure to accomplish positioning of a container being held by the pick-up head.

The orienting assembly comprises a frame means including a plurality, and preferably two mounting plates, rotatably or pivotally mounted relative to the pick-up head. A stabilization means in the form of a yoke element is fixedly attached to a rotary shaft of the pick-up head and disposed for engagement with a peripheral edge of at least one of the mounting plates. The stabilization means or yoke element includes an angularly oriented surface which is specifically configured to correspond substantially to a portion of the peripheral edge of one of the mounting plates which also has a similar angular configuration. A predetermined length of the remainder of the peripheral edge has a curvilinear configuration. Upon rotation of the frame means, this curvilinear configuration rides along the angular surface of the yoke element. In either attitude, the sliding engagement between these two elements serves to effectively stabilize the frame relative to the position of the pick-up head. When the angularly configured surface of the yoke element is disposed in mating engagement with the similarly configured surface of the peripheral edge, a stabilizing effect resembling a locking engagement is established which in turn serves to essentially stabilize the position of the head relative to the frame means. This performance naturally aids in the efficiency of opertion and effectiveness of the entire structural assembly.

An actuating means in the form of a fluid actuated, hydraulic piston and cylinder assembly is mounted on the frame means is driving relation to a lever means itself connected, at least in part, directly to the rotary shaft of the pick-up head.

More specifically, the lever means includes a lever arm fixedly attached and disposed in spaced apart, upwardly extending relation from the rotary shaft when the pick-up head is in its normal upright orientation. The lever means further includes linkage means which, dependent upon the particular embodiment may include a single one-piece linkage element fixedly or integrally attached to the lever arm at one portion and movably attached to the piston portion of the fluid and piston assembly whereby activation of the piston and cylinder assembly causes pivotal rotation of the rotary shaft due to interaction of the piston portion with the lever arm.

In another embodiment of the present invention, the linkage means comprises at least two links one of which includes the lever arm itself and the second of which comprises a link element pivotally connected at opposite ends or spaced apart portions to the piston portion of the cylinder and piston assembly and the lever arm itself.

The frame means further comprises attachment means connected thereto wherein the attachment means is at least partially defined by a pivot shaft rotatably attached to the mounting plates at opposite ends thereof. A connection plate with a properly structured sleeve element is attached directly to the pivot shaft and is specifically adapted for mating engagement with the free end of the boom structure for supporting the entire orienting assembly as well as the pick-up head attached thereto. The pivot shaft comprising a part of the attachment means is disposed and attached to the remainder of the orienting assembly so as to define the pivotal or rotational axis of the frame means wherein the pick-up head is pivotally mounted relative to the plates by virtue of it being fixedly attached to the lever arm as set forth above.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION

Figure 1:
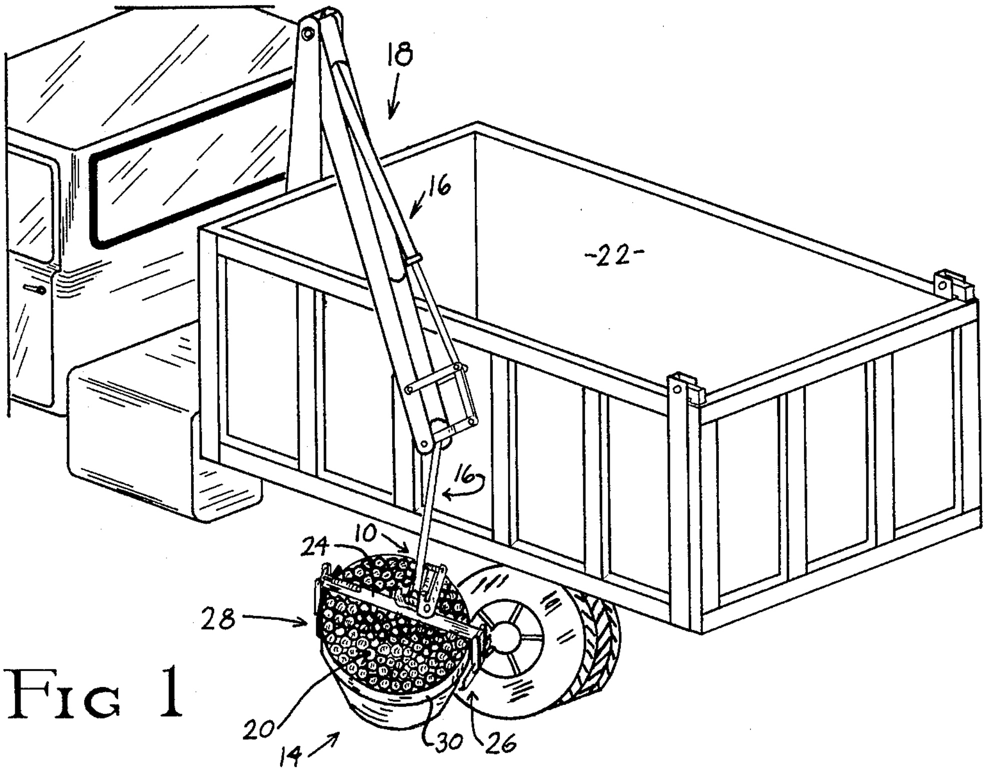
FIG. 1 is an isometric view of the orienting assembly operatively attached to a pick-up head and a supporting boom structure wherein the pick-up head is ready for loading of the container into an open bed truck body.
Figure 2:
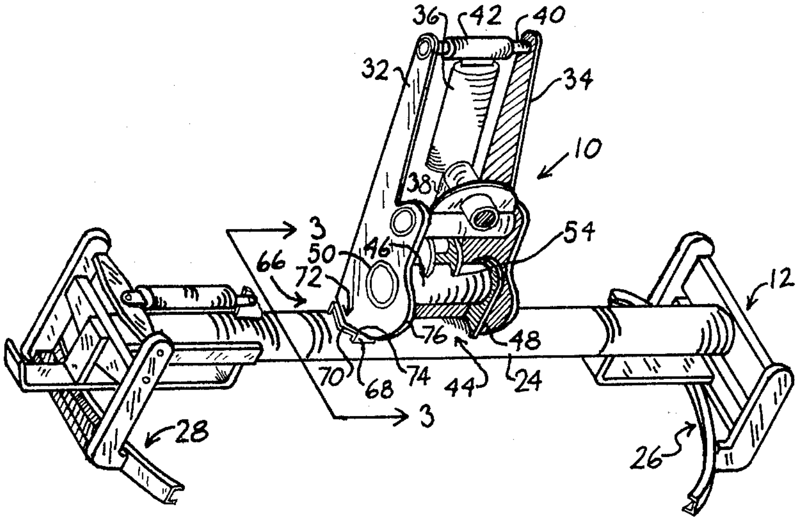
FIG. 2 is an isometric view of the pick-up head and orienting assembly attached thereto wherein the pick-up head is maintained in its normally oriented position.

As shown in FIGS. 1 and 2, the orienting device of the present invention is generally indicated as 10 and is designed to be used primarily with a pick-up head structure generally indicated as 12 of the type used to carry bulk type containers 14 while being supported by a boom structure 16 which may be attached to a truck body or like facility 18. It is common practice in the citrus, agricultural industry to load citrus products 20 in the large containers 14 and, by virtue of handling these containers, transport the citrus product 20 into the open bed 22 of the truck 18 for transportation to the packing or processing facility.

With reference to FIG. 2, the pick-up head 12 may comprise a number of applicable structures and generally includes a rotary shaft 24 and spaced apart, oppositely disposed grasping members 26 and 28. Commonly, one of the grasping members such as 28 is expandable to move relative to the rotary shaft 24 so as to allow the pick-up head 12 to fit over the upper rim 30 of the container 14. Upon such placement, the grasping element 28 closes or moves inwardly relative to the rotary shaft 24 and the other grasping element 26 so as to properly grip the rim 30 and container 14 for positioning into a tilting or loading position. Once displaced over the open bed 22 of truck 18 the orienting assembly 10, as will described in greater detail hereinafter, is activated causing a tilting positioning or orientation of the container 14 for the emptying of the citrus contents 20 in the container, into the open bed 22 of truck 18. (See FIGS. 3 and 4—broken lines).

With regard to the orienting assembly itself, it comprises a frame means including mounting plates 32 and 34 disposed in spaced apart relation to one another and serving as a supporting frame for the activation means which comprises a fluid activated cylinder 36 and piston 38, respectively, assembly mounted in substantially enclosed relation between the plates 32 and 34. A connecting shaft 40 is placed at the upper or free end of the mounting plates 32 and 34 and has mounted thereon a connecting sleeve 42 for interconnection to the free end of the cylinder 36 as shown in FIG. 2. Accordingly, the cylinder has one end mounted directly to the frame means comprising the mounting plates 32 and 34 and the opposite end disposed in driving interconnection with the piston portion 38 of the assembly.

The orienting assembly of the present invention further comprises a lever means generally indicated as 44 and including in part a lever arm 46 fixedly attached as by collar elements 48 to rotary shaft 24. Similarly, the opposite ends of the lever arm 46 are rotatably connected to each of the mounting plates 32 and 34 as at 50. Thereby relative movement occurs between rotary shaft 24 and, of course, the pick-up head 12 and the mounting plates 32 and 34 comprising the frame means. This movement, of course, defines the predetermined orientation of the pick-up head and the container 14 grasped thereby through activation of the activation means including cylinder 36 and piston 38 disposed in driving relation to the lever arm 46.

Figure 3:
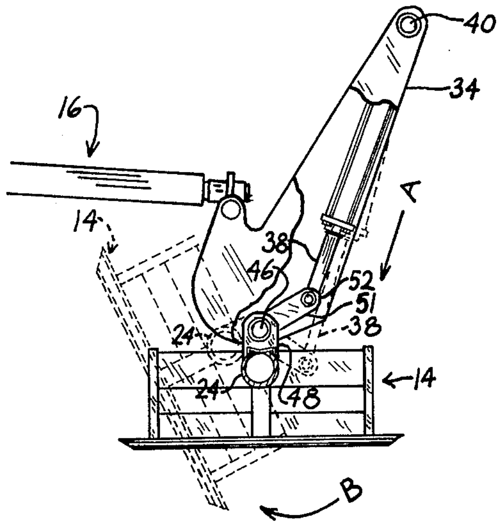
FIG. 3 is an end, sectional view taken along line 3—3 of FIG. 2 showing one embodiment of the present invention wherein the linkage means comprises a single fixedly attached linkage element.
Figure 4:
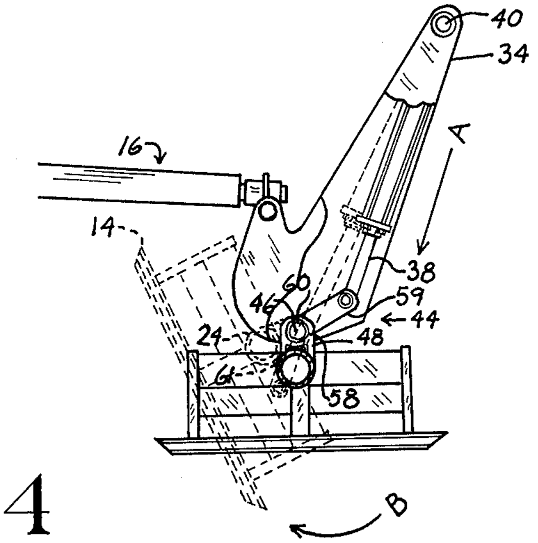
FIG. 4 is an end view of another embodiment directed to the linkage means of the present invention.

With reference to FIGS. 3 and 4, the lever means further includes linkage means. In the first embodiment as represented in FIG. 3, the linkage means includes a single linkage element 51 pivotally or rotatably mounted to the end of piston 38 as at 52. The opposite end of linkage element 51 is fixedly attached to the lever arm 46 as at 54 (FIG. 2). By virtue of this connection and as shown in broken lines in FIG. 3, activation of the cylinder and piston assembly, causing the downward movement of piston 38, in turn causes rotation of rotary shaft 24 because of the displacement of linkage element 51 and the integrally or fixedly attached lever arm 46. This in turn causes the tilting or dispensing orientation or position of the container 14, again as set forth with respect to FIG. 3.

Another embodiment of the present invention is shown in FIG. 4 wherein the linkage means 44 comprises a first link 58 and a second link 59 pivotally attached to one another as at 60. As is obvious from the representation in FIG. 4, the first link 58 comprises the lever arm itself while the second link 59 is similar to the linkage element 51 as shown in FIG. 3, the difference being its pivotal connection to the lever arm 58. In operation, extension of the piston portion 38 from the cylinder 36 causes pivotal or rotational movement of the rotary shaft 24 by virtue of the second linkage element 59 being of sufficient linear dimension to rotate about the lever arm or first linkage element 58 and come into actual contact and driving engagement with the rotary shaft 24 at point 61 represented in broken lines in FIG. 4. Accordingly, the rotary shaft 24 is caused to be positioned such that the pick-up head and the attached container 14 is disposed in its tilted position (FIG. 4).

Another structural feature of the present invention comprises the provision of a stabilizing means generally indicated as 66 and including a yoke element 68 fixedly attached to the rotary shaft 24 as shown in FIG. 2. The stabilizing means may comprise an additional yoke element disposed in cooperative relation to plate 34 as well as plate 32 as shown in FIG. 2. However, for the purpose of clarity, the particular structure mentioned above will be described with relation to a single yoke element 68. In this regard, yoke element 68 comprises an angularly oriented planar surface 70 disposed for sliding engagement with the peripheral edge of mounting plate 32 as at 72. Accordingly, a predetermined portion of this peripheral edge also has an angular configuration as at 74 which corresponds to the angular configuration 70 of the yoke element. The remainder of the peripheral edge 76 is also disposed to slidingly engage the angular surface 70 of the yoke element 68 when the frame is in a different angular orientation relative to the rotary shaft 24 as caused by the pivotal or tilting position of the pick-up head through activation of the activation means. In any event, when the angular configuration at 74 of the peripheral edge 72 is disposed into mating engagement with the angular surface 70 of yoke element 68, the frame or mounting plates 32 and 34 are effectively stabilized in the position shown in FIG. 2. This stabilization tends to essentially bias the mounting plates relative to the pick-up head and rotary shaft 24 to accomplish more effective and efficient operation in the positioning of the pick-up head as desired. Similarly, the curvilinear peripheral edge portion 76 rides upon the angular surface 70 of yoke element 68 and also accomplishes a stabilizing effect causing more precise, predictable movement between the mounting plates 32 and 34 and the rotary shaft 24 and pick-up head 12.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. An orienting assembly of the type primarily designed for use in positioning a boom supported pick-up head having a rotary shaft, said orienting assembly comprising:

frame means pivotally connected to the pick-up head in supporting relation thereto, said frame means disposed in movably interconnected relation between the head and the boom;

activating means disposed in driving, movable interconnection to the pick-up head;

lever means having at least a portion thereof fixedly attached to said rotary shaft of said pick-up head and movably connected in driven relation to said activation means;

attachment means including a pivot shaft rotatably connected to said frame means and disposed for supported attachment to the boom, whereby the head is pivotable relative to said frame means upon operation of said activation means;

said frame means comprising at least two mounting plates rotatably mounted on said pivot shaft and each disposed in spaced apart relation to one another and in at least partially surrounding relation to said activation means; and stabilization means mounted on said rotary shaft in sliding engagement with a peripheral edge portion of at least one of said mounting plates, said stabilization means correspondingly configured to at least a portion of the length of said peripheral edge, said one mounting plate biased into stabilized position upon mating engagement between said correspondingly configured peripheral edge and said stabilization means.

2. An orienting assembly as in claim 1 wherein said lever means comprises a lever arm fixed to the rotary shaft, and disposed between said mounting plates in rotatable attachment therewith, said lever arm disposed in driven connection relative to said activation means.

3. An orienting assembly as in claim 2 wherein said activation means comprises a fluid activated piston and cylinder assembly, said piston drivingly interconnected between said cylinder and said lever arm, said cylinder movably attached to said mounting plates and drivingly connected to said piston, whereby upon activation of said piston and cylinder assembly said mounting plates are caused to pivot about said pivot shaft and orient the pick-up head.

4. An orienting assembly as in claim 3 wherein said stabilization means comprises a yoke element including a substantially angularly configured surface corresponding to an angular configuration of said peripheral edge portion of said one mounting plate and disposed in sliding engagement therewith.

5. An orienting assembly as in claim 4 wherein a predetermined portion of the remainder of said peripheral edge is curvilinear and is disposable in sliding engagement with said substantially angularly configured surface of said yoke element.

6. An orienting assembly as in claim 1 wherein said lever means further comprises linkage means disposed in movable, interconnected relation between said activation means and the rotary shaft of the pick-up head, said linkage means dimensioned and configured in driving relation to the rotary shaft and in direct driven relation to said activation means, whereby operation of said activation means determines the position of said pick-up head.

7. An orienting assembly as in claim 6 wherein said linkage means comprises a single linkage element having one end connected to the lever means and the opposite end pivotally connected to said activation means, whereby operation of said activation means causes predetermined orientation of the pick-up head through interconnection with said activation means by said single linkage element.

8. An orienting assembly as in claim 6 wherein said linkage means comprises a first link and a scond link pivotally interconnected to one another, said first link comprising a lever arm disposed in fixed attachment to the rotary shaft and movably attached to said second link, said second link having one end pivotally attached to said activation means and the other end movably connected to said first link, said second link including a linear dimension sufficient for movable placement into driving relation with said lever arm, whereby driving engagement between said second link and said lever arm causes predetermined orientation of the pick-up head.

* * * * *